G. G. M. HARDINGHAM.
CUTTER FOR MILLING SCREW THREADS.
APPLICATION FILED JUNE 9, 1919.
1,335,892.
Patented Apr. 6, 1920.
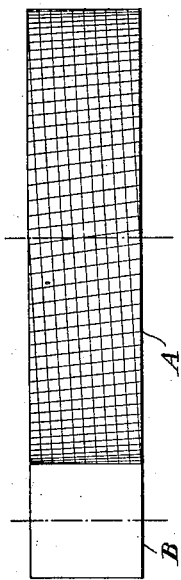
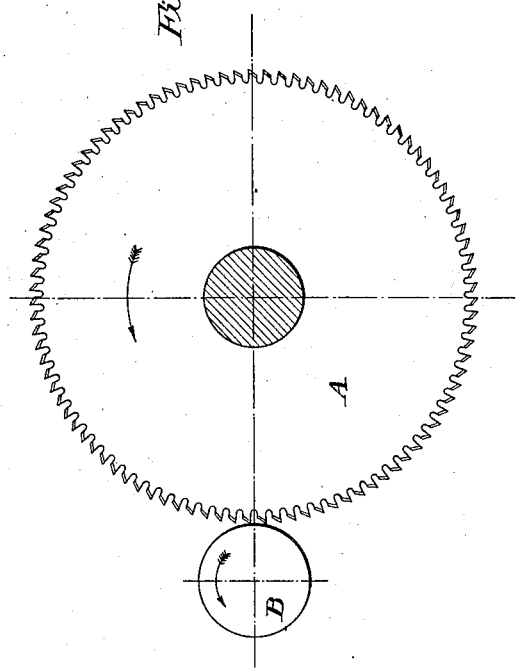
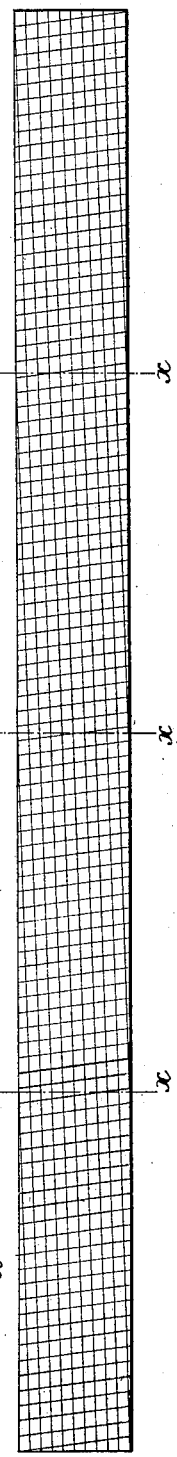
Inventor

UNITED STATES PATENT OFFICE.

GEORGE G. M. HARDINGHAM, OF WESTMINSTER, LONDON, ENGLAND, ASSIGNOR TO THE RICHARDS THREAD MILLING MACHINE COMPANY, (1913) LIMITED, OF LONDON, ENGLAND.

CUTTER FOR MILLING SCREW-THREADS.

1,335,892.  Specification of Letters Patent.  Patented Apr. 6, 1920.

Application filed June 9, 1919. Serial No. 302,933.

*To all whom it may concern:*

Be it known that I, GEORGE GATTON MELHUISH HARDINGHAM, a subject of the King of Great Britain and Ireland, residing at Clun House, Surrey street, in the city of Westminster, London, England, have invented new and useful Improvements in Cutters for Milling Screw-Threads, of which the following is a specification.

This invention relates to milling cutters of the "hob" type; that is to say, rotary cutters which have their teeth arranged in spiral threads, are rotated at a definite speed in relation to that of the work-piece, are capable of being advanced in a direction at right angles to the axis of the work, but partake of no axial movement in relation thereto. The present invention is moreover confined to multiple-thread hobs, and is designed to avoid the formation of facets in the surface of the work treated, or to reduce them to such a degree as to render them practicably negligible.

Assuming my improved method of manufacture to be applied in the production, by way of example, of a four-thread hob, the latter making one rotation to four revolutions of the work-piece, so that each of the four quadrants of the hob successively revolves in contact with the work during four successive revolutions of the latter, we divide the circumference of the hob into as many equally spaced teeth as will be equal to four times any number selected as appropriate for each quadrant ∓ one. For instance, if 24 teeth be regarded as affording an appropriate spacing for the teeth in a quadrant, the total number of teeth in the circumference will be 96∓1; that is to say 95 or 97. Under such conditions, the starting points of the threads in each successive quadrant, when applied to the work, are ¼th of the pitch of the teeth in advance or in arrear of the points at which the teeth pertaining to the previous quadrant of the hob became operative. The teeth of the next quadrant in succession will be half a tooth in advance or in arrear, and those of the next quadrant, three fourths of a tooth in advance or in arrear. In this manner, the facets formed by the teeth of the first quadrant are, in the course of one revolution of the hob, reduced to one fourth of their original length.

The accompanying drawings illustrate a hob of the character above described, Figure 1 being a face view, Fig. 2 a plan, and Fig. 3 a diagram representing its unfolded peripheral surface. A is the hob, and B the work-piece; the latter revolving in the same direction as the hob, but at four times its rotative speed, the hob being four-threaded. In Figs. 2 and 3, the individual teeth are not shown; but it will be understood that, in these figures, the inclined longitudinal lines represent threads, and the transverse lines the chases whereby the threads are divided into teeth; the latter being then "backed off," so as to assume the form shown in Fig. 1. Or, if the transverse lines be regarded as representing the teeth, then the points at which they intersect the inclined longitudinal lines will represent the points of the teeth.

The unfolded surface, Fig. 3, is divided by the lines $x$ $x$ $x$ into four equal parts, each of which comes successively into operation upon the work-piece while the latter makes four complete revolutions. If the diagram be examined and the relation of the dividing lines $x$ $x$ $x$ to the threads observed, it will be seen that the threads comprised in each of the four sections have, on entering each fresh section, starting points different from those at which they entered the previous section. For example, during four revolutions of the work-piece, the threads $a'$, $a^2$, $a^3$, $a^4$, successively come into operation upon the same part of the work, but one quarter of the pitch of the teeth later in each section. By these means, facets formed by the teeth comprised in the portion of the thread $a'$ are gradually eliminated by the successive operation of those respectively comprised in the portions $a^2$, $a^3$, $a^4$.

The same principle of construction is applicable to a 3-thread, 5-thread or other multiple-thread, hob. The total number of teeth in the circumference of a 3-thread hob will be three times the number adopted as appropriate for each ⅓rd sector of the hob ∓ one; the hob will be rotated at one-third the speed of the work-piece, and the facets will be reduced to one-third of their original length. In a 5-thread hob, the total number of teeth in the circumference thereof will be five times the number of teeth adopted as appropriate for each $\frac{1}{5}$th sector of the hob ± one, the hob will be rotated at one-fifth the speed of the work-piece, and the facets will be reduced to one-fifth of their original length.

The transverse chases in the hob, whereby the threads thereof are divided into teeth, may be given any degree of obliquity with a view to equalizing the work during the screw-threading operation; but I prefer to arrange them as nearly as may be at right angles to the direction of the threads as affording the best cutting faces to the teeth.

I claim:—

1. For use in milling screw-threads, a multiple thread hob having equally spaced transverse chases whereof the total number, plus or minus one, is divisible by the number of threads constituting the multiple thread employed.

2. For use in milling screw-threads, a four-threaded hob having equally spaced transverse chases whereof the total number, plus or minus one, is divisible by four.

G. G. M. HARDINGHAM.